United States Patent
Soma et al.

(10) Patent No.: US 12,307,158 B2
(45) Date of Patent: May 20, 2025

(54) AUDIO MIXER, AND METHOD OF CONTROLLING AUDIO MIXER

(71) Applicant: YAMAHA CORPORATION, Hamamatsu (JP)

(72) Inventors: Keiichiro Soma, Hamamatsu (JP); Takeshi Nonaka, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 275 days.

(21) Appl. No.: 18/186,626

(22) Filed: Mar. 20, 2023

(65) Prior Publication Data

US 2023/0315379 A1 Oct. 5, 2023

(30) Foreign Application Priority Data

Mar. 22, 2022 (JP) ................................ 2022-045332

(51) Int. Cl.
*G06F 3/16* (2006.01)
*G06F 3/04847* (2022.01)
*H04S 3/00* (2006.01)

(52) U.S. Cl.
CPC .............. *G06F 3/165* (2013.01); *H04S 3/008* (2013.01); *G06F 3/04847* (2013.01);
(Continued)

(58) Field of Classification Search
CPC ...... G06F 3/165; G06F 3/04847; G06F 3/162; H04S 3/008; H04S 2400/01; H04S 2400/13
See application file for complete search history.

(56) References Cited

U.S. PATENT DOCUMENTS

| | | | |
|---|---|---|---|
| 2007/0025568 A1 | 2/2007 | Aiso et al. | |
| 2010/0303262 A1* | 12/2010 | Okabayashi | H04H 60/04 381/119 |

(Continued)

FOREIGN PATENT DOCUMENTS

| | | | | |
|---|---|---|---|---|
| EP | 2276186 A2 * | 1/2011 | ............. | H04H 60/04 |
| JP | H06310957 A | 11/1994 | | |
| JP | 5326214 B2 * | 10/2013 | ............. | H04H 60/04 |

OTHER PUBLICATIONS

Extended European Search Report issued in European Appln. No. 23162668.0 mailed Jul. 14, 2023.

(Continued)

*Primary Examiner* — David L Ton
(74) *Attorney, Agent, or Firm* — ROSSI, KIMMS & McDOWELL LLP

(57) ABSTRACT

An audio mixer includes an operation panel that includes a plurality of physical controllers that control a value of a parameter. The audio mixer has a signal processor that processes an audio signal to be outputted from a plurality of input channels to a plurality of mixing buses according to the value of the parameter, and a processor that controls an operation of the signal processor. The plurality of physical controllers include a first physical controller that controls a value of a first parameter and a second physical controller that controls a value of a second parameter. The processor, in a first mode, divides the plurality of input channels into a first input channel of a first signal processing system and a second input channel of a second signal processing system different from the first signal processing system, divides the plurality of mixing buses into a first mixing bus of the first signal processing system and a second mixing bus of the second signal processing system, controls the signal processor to perform a first operation to process an audio signal to be outputted from the first input channel to the first mixing bus according to the value of the first parameter in the first signal processing system, and controls the signal processor to perform a second operation to process an audio signal to be outputted from the second input channel to the second mixing bus according to the value of the second parameter in the second signal processing system, in a second mode different from the first mode, controls, by using the plurality of input channels and the plurality of mixing buses as part of the same signal processing system, the signal processor to perform a third operation to process an audio signal to be outputted from the plurality of input channels to the plurality of mixing buses according to the value of the first parameter and the value of the second parameter in the same signal processing system.

18 Claims, 11 Drawing Sheets

(52) U.S. Cl.
CPC .......... *G06F 3/162* (2013.01); *H04S 2400/01* (2013.01); *H04S 2400/13* (2013.01)

(56) References Cited

U.S. PATENT DOCUMENTS

| | | | |
|---|---|---|---|
| 2011/0075864 A1* | 3/2011 | Hagiwara | H04H 60/04 |
| | | | 381/119 |
| 2017/0288798 A1* | 10/2017 | Saito | H04S 3/008 |
| 2021/0235211 A1* | 7/2021 | Imai | H04S 3/002 |
| 2021/0286583 A1 | 9/2021 | Saito et al. | |

OTHER PUBLICATIONS

Yamaha. "Digital Mixing Console CL5 CL3 CL1 Reference Manual". Yamaha Music Manuals, Dec. 31, 2012. Cited in NPL1.
Communication Pursuant to Article 94(3) EPC issued in European Appln. No. 23162668.0 mailed Aug. 16, 2024.

* cited by examiner

FIG.3

|     | INPUT PORT | | | | | |
| --- | --- | --- | --- | --- | --- | --- |
| Ch1 | 1 | 2 | 3 | 4 | 5 | 6 |
| Ch2 | 1 | 2 | 3 | 4 | 5 | 6 |
| Ch3 | 1 | 2 | 3 | 4 | 5 | 6 |
| Ch4 | 1 | 2 | 3 | 4 | 5 | 6 |
| Ch5 | 1 | 2 | 3 | 4 | 5 | 6 |
| Ch6 | 1 | 2 | 3 | 4 | 5 | 6 |

FIG.10

| Ch A/B Copy | | | | | |
|---|---|---|---|---|---|

Copy Direction

Ch A → Ch B    Ch B → Ch A

Ch A [1] - [8]   →   Ch B [1] - [8]

Copy Parameter

| Patch | HA | Harmo | Phase | D.Gain | HPF/LPF |
|---|---|---|---|---|---|
| Name | EQ | Dyn 1 | Dyn 2 | Ins | Direct |
|  | To St | Surr | Delay | Fader | Ch On |

✓ Set GC for copied HA

Cancel    Copy

AUDIO MIXER, AND METHOD OF CONTROLLING AUDIO MIXER

CROSS REFERENCE TO RELATED APPLICATIONS

This Nonprovisional application claims priority under 35 U.S.C. § 119(a) on Patent Application No. 2022-045332 filed in Japan on Mar. 22, 2022, the entire contents of which are hereby incorporated by reference.

BACKGROUND

Technical Field

The present disclosure relates to an audio mixer and a method of controlling the audio mixer.

Background Information

Japanese Unexamined Patent Application Publication No. H06-310957 discloses that a plurality of digital mixers of the same kind are prepared and connect a mix output connector in a preceding stage to a sub mix in connector in a subsequent stage by use of a common input board.

SUMMARY

An embodiment of the present disclosure is directed to provide an audio mixer that is easy to use when a plurality of persons use one mixer.

An audio mixer includes an operation panel that includes a plurality of physical controllers that control a value of a parameter. The audio mixer has a signal processor that processes an audio signal to be outputted from a plurality of input channels to a plurality of mixing buses according to the value of the parameter, and a processor that controls an operation of the signal processor.

The plurality of physical controllers include a first physical controller that controls a value of a first parameter and a second physical controller that controls a value of a second parameter.

The processor, in a first mode, divides the plurality of input channels into a first input channel of a first signal processing system and a second input channel of a second signal processing system different from the first signal processing system, divides the plurality of mixing buses into a first mixing bus of the first signal processing system and a second mixing bus of the second signal processing system, controls the signal processor to perform a first operation to process an audio signal to be outputted from the first input channel to the first mixing bus according to the value of the first parameter in the first signal processing system, and controls the signal processor to perform a second operation to process an audio signal to be outputted from the second input channel to the second mixing bus according to the value of the second parameter in the second signal processing system, in a second mode different from the first mode, controls, by using the plurality of input channels and the plurality of mixing buses as part of the same signal processing system, the signal processor to perform a third operation to process an audio signal to be outputted from the plurality of input channels to the plurality of mixing buses according to the value of the first parameter and the value of the second parameter in the same signal processing system.

According to the present embodiment, an audio mixer that is easy to use when a plurality of persons use one mixer is able to be provided.

BRIEF DESCRIPTION OF THE DRAWINGS

FIG. 3 is a view showing a setup screen of an input patch.

FIG. 10 is a view showing an example of a channel copy receiving screen displayed on a display 11.

DETAILED DESCRIPTION

Figure 1:
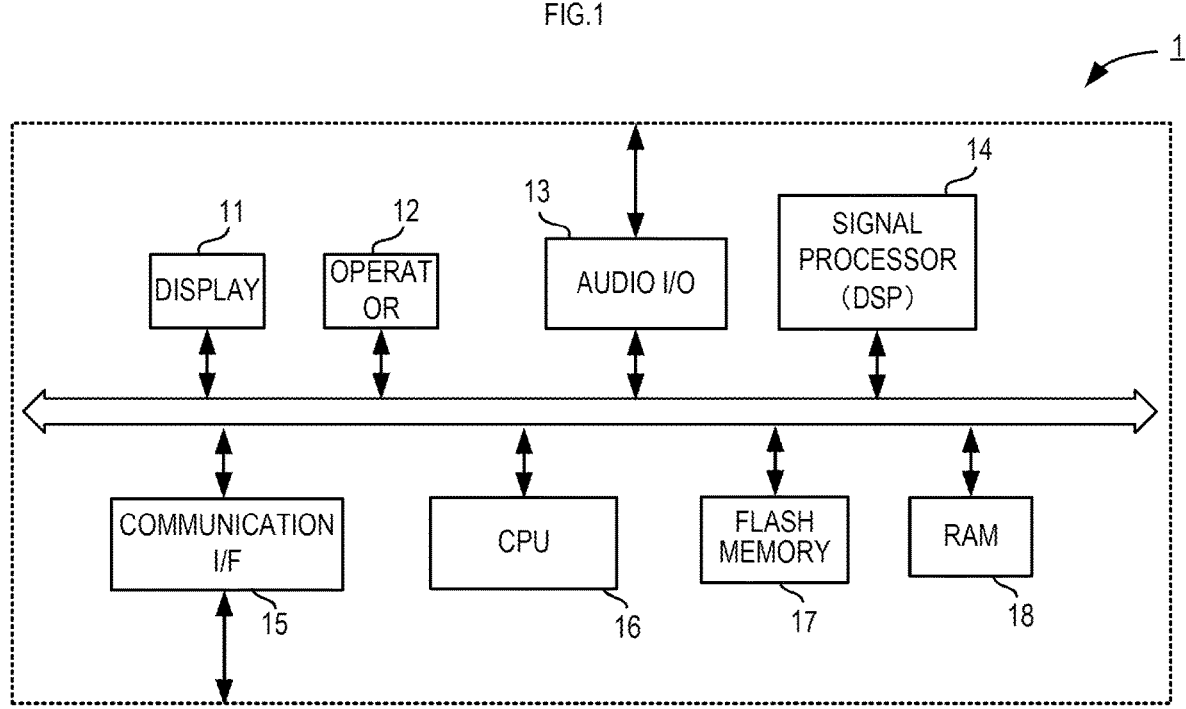
FIG. 1 is a block diagram showing a configuration of an audio mixer.

FIG. 1 is a block diagram showing a configuration of an audio mixer 1. The audio mixer 1 includes a display 11, an operator 12, an audio I/O (Input/Output) 13, a signal processor 14, a communication interface (I/F) 15, a CPU 16, a flash memory 17, and a RAM 18.

The display 11, the operator 12, the audio I/O (Input/Output) 13, the signal processor 14, the communication interface (I/F) 15, the CPU 16, the flash memory 17, and the RAM 18 are connected to each other.

The audio I/O 13 is an interface for receiving an input of an audio signal to be processed in the signal processor 14. The audio I/O 13 includes an analog input port, a digital input port, or the like that receives the input of an audio signal. In addition, the audio I/O 13 is an interface for outputting an audio signal that has been processed in the signal processor 14. The audio I/O 13 includes an analog output port, a digital output port, or the like that outputs the audio signal.

The communication I/F 15 is an interface for communicating with other devices. The communication I/F 15 is connected to an external PC, for example. Alternatively, the communication I/F 15 sends and receives an audio signal according to standards such as Dante (registered trademark), via a network.

The CPU 16 is a processor that controls the operation of the audio mixer 1. The CPU 16 reads out a predetermined program stored in the flash memory 17 being a storage to the RAM 18 and performs various types of operations.

The display 11 displays various types of information according to the control of the CPU 16. The display 11 includes an LCD, an OLED, an LED, or the like, for example.

The operator 12 receives an operation to the audio mixer 1, from a user. The operator 12 includes various types of keys, buttons, switches, rotary encoders, sliders, and the like. In addition, the operator 12 may include a touch panel stacked on the display 11.

The signal processor 14 includes a DSP for performing various types of signal processing such as mixing processing or effect processing. The signal processor 14 performs signal processing such as mixing processing or effect processing on an audio signal to be supplied from the audio I/O 13 or the communication I/F 15. The signal processor 14 outputs a digital audio signal on which the signal processing has been performed, through the audio I/O 13 or the communication network I/F 15.

Figure 2:
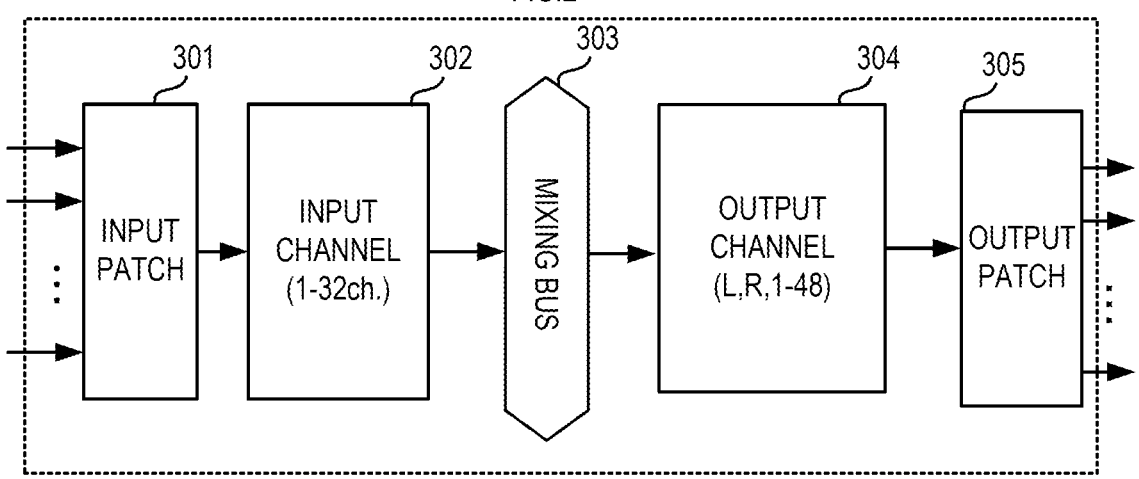
FIG. 2 is a functional block diagram of signal processing.

FIG. 2 is a functional block diagram of signal processing. As shown in FIG. 2, the signal processing is functionally performed through an input patch 301, an input channel 302, a mixing bus 303, an output channel 304, and an output patch 305.

The input patch 301 inputs an audio signal from a plurality of input ports (an analog input port or a digital input port, for example) in the audio I/O 13, and assigns any one port of a plurality of ports to at least one channel of the plurality of input channels (32ch, for example).

FIG. 3 is a view showing an example of a setup screen of the input patch 301. The setup screen of the input patch 301 is displayed on the display 11. The setup screen of the input patch 301 displays a channel name and a port number by a matrix. A touch panel is stacked on the display 11. A user, by selecting each port number of the matrix, designates a channel to be assigned to each port. As a result, the audio signal is supplied to each channel in the input channel 302.

Figure 4:
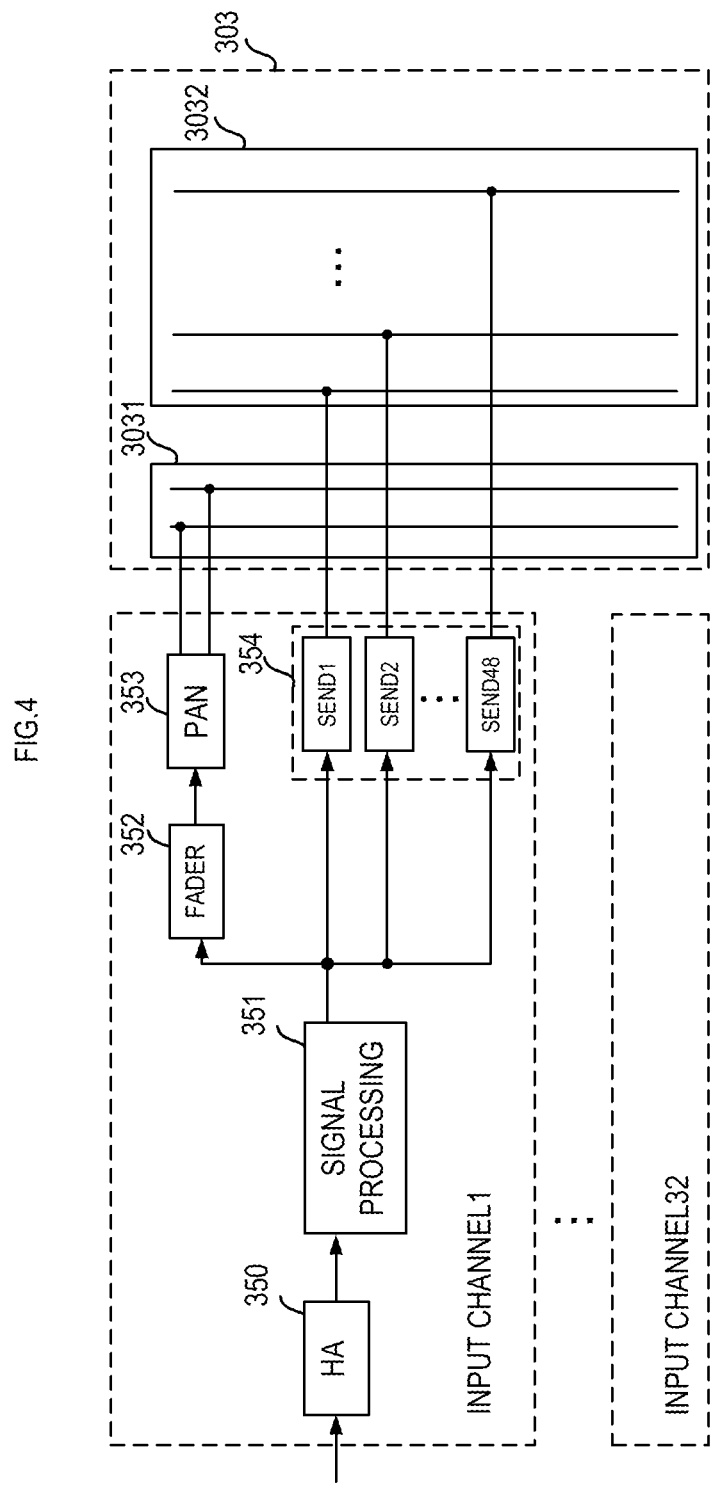
FIG. 4 is a block diagram functionally showing a configuration of signal processing of an input channel 302 and a mixing bus 303.

FIG. 4 is a block diagram functionally showing a configuration of signal processing of the input channel 302 and the mixing bus 303. Each channel in the input channel 302 performs the gain adjustment of an audio signal in a head amplifier (HA) 350 corresponding to a port to be assigned in the input patch 301. In addition, each channel of the input channel 302 performs signal processing such as an equalizer and a compressor, in a signal processing block 351, on the audio signal on which the gain adjustment has been performed in the HA 350.

The audio signal on which the signal processing has been performed is level-adjusted in a fader (FADER) 352, and then sent out to the mixing bus 303 in a subsequent stage, through a pan (PAN) 353. The pan 353 adjusts a balance of a signal to be supplied to a stereo bus (a two-channel bus being as a master output) 3031 of the mixing bus 303.

In addition, the audio signal on which the signal processing has been performed is level-adjusted in a sender (SEND1 to SEND48) 354, and then sent out to the mixing bus 303 in the subsequent stage. The sender 354 is switched by a user to determine whether or not to supply a signal to each supplied to each MIX bus 3032 (MIX1 to MIX48) of the mixing bus 303, Furthermore, the sender 354 adjusts a level of the signal to be supplied to each MIX bus according to each send level set by the user.

The output channel 304 has the same number of channels as the number of mixing buses. In each channel in the output channel 304, various kinds of signal processing are performed on an audio signal outputted from the mixing bus 303. Each channel in the output channel 304 sends out the audio signal on which the signal processing has been performed, to the output patch 305. The output patch 305 assigns each channel to any one of a plurality of ports as an analog output port or a digital output port. As a result, the audio signal on which the signal processing has been performed is supplied to the audio I/O 13.

The above signal processing is controlled based on a value of various parameters. The CPU 16 stores a current value (current data) of the various parameters, in the RAM 18. The CPU 16 updates the current data when a user operates the operator 12.

Figure 5:
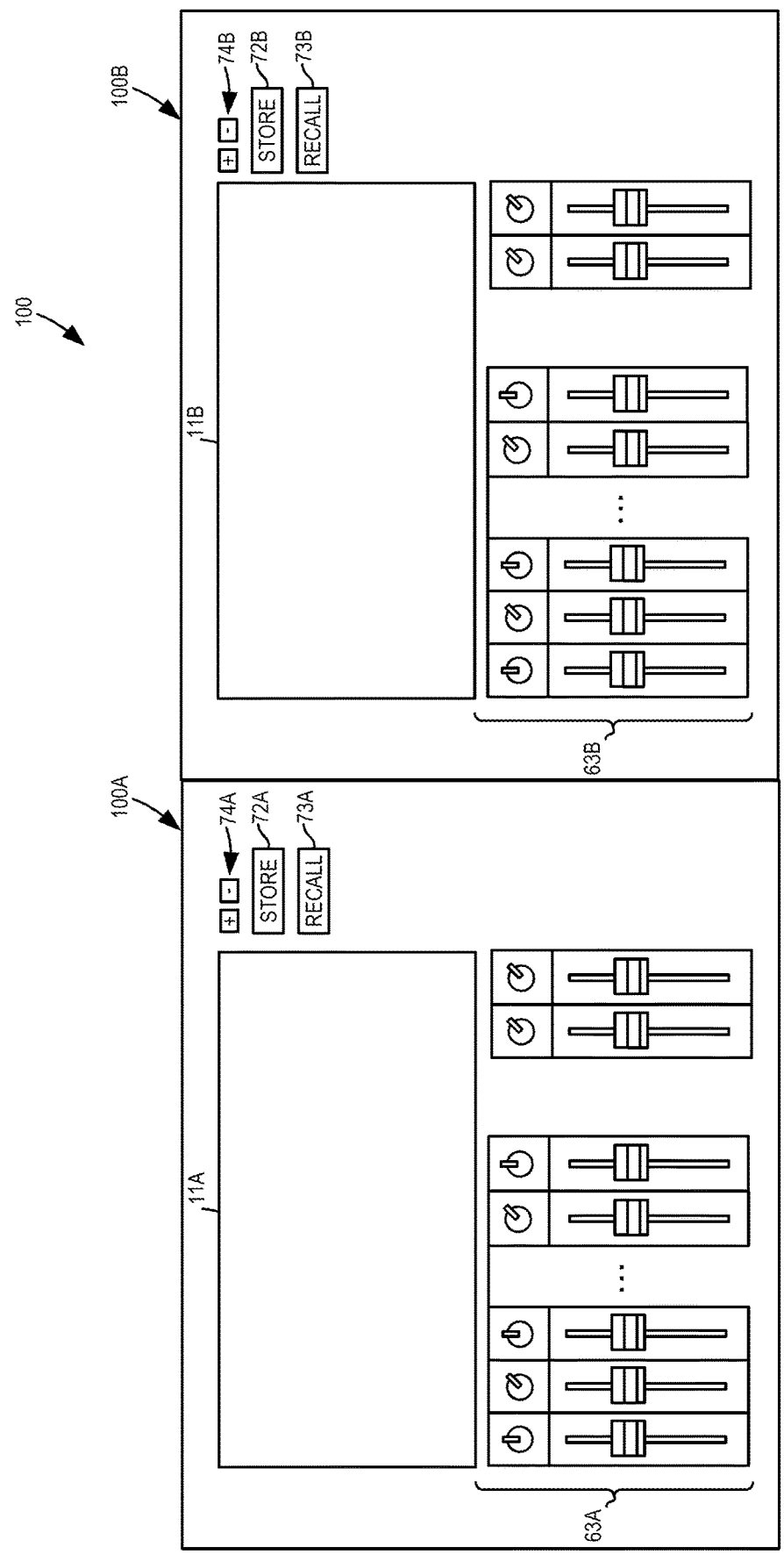
FIG. 5 is a view showing a configuration of an operation panel 100 of the audio mixer 1.

FIG. 5 is a view showing a configuration of an operation panel 100 of the audio mixer 1. The operation panel 100 of the audio mixer 1, as shown in FIG. 5, has a first section 100A and a second section 100n.

The first section 100A includes a display 11A, a channel strip 63A, a STORE button 72A, a RECALL button 73A, and an increase and decrease button 74A. The display 11A is a display obtained by stacking a touch panel being one embodiment of the operator 12, and displays a GUI (Graphical User Interface) screen for receiving an operation from a user. The GUI, the channel strip 63A, the STORE button 72A, the RECALL button 73A, and the increase and decrease button 74A of the display 11A are equivalent to the operator 12, and correspond to a first physical controller of the present disclosure.

The second section 100B includes a display 11B, a channel strip 63B, a STORE button 72B, a RECALL button 73B, and an increase and decrease button 74B. The display 11B is a display obtained by stacking a touch panel being one embodiment of the operator 12, and displays a GUI (Graphical User Interface) screen for receiving an operation from a user. The GUI, the channel strip 63B, the STORE button 72B, the RECALL button 73B, and the increase and decrease button 74B of the display 11B are equivalent to the operator 12, and correspond to a second physical controller of the present disclosure.

The channel strip 63A and the channel strip 63B each are an area in which a plurality of physical controllers that receive an operation with respect to one channel are disposed vertically. Each channel of the channel strip 63A and the channel strip 63B has a physical controller corresponding to the fader (FADER) 352, the pan (PAN) 353, and the sender 354 that are shown in FIG. 4. The audio mixer 1 receives an operation of a parameter through the physical controller (the first physical controller) of the channel strip 63A, and the physical controller (the second physical controller) of the channel strip 63B.

It is to be noted that, although FIG. 4 only shows one fader and one knob for each channel as the physical controllers, a large number of knobs, switches, or the like may be provided in practice.

Each of the channel strip 63A and the channel strip 63B is able to assign any input channel. For example, the channel strip 63A has 16 channel strips, and is able to assign input channels 1 to 16. In addition, the channel strip 63B has 16 channel strips, and is able to assign input channels 17 to 32.

Furthermore, the channel strip 63A and the channel strip 63B may assign a separately different input channel or may assign the same input channel. For example, the channel strip 63A may assign the input channels 1 to 16, and the channel strip 63B may also assign the input channels 1 to 16.

Moreover, in this example, although the number of input channels and the number of channel strips are equally 32, the number of input channels may be larger than the number of channel strips. For example, even when the number of input channels is 64, each of the channel strip 63A and the channel strip 63B is able to assign any input channel among the 64 input channels.

The STORE button 72A and the STORE button 72B are buttons to instruct to store the data of a scene memory. A user, by operating the STORE button 72A or the STORE button 72B, can cause the flash memory 17 to memorize (store) current data as data of one scene memory. The flash memory 17 stores a plurality of scene memories. In addition, the user, by operating the increase and decrease button 74A or the increase and decrease button 74B, can select a scene memory to be stored and called, from the plurality of scene memories. The user, by operating the RECALL button 73A or the RECALL button 73B to call data of a required scene memory, can call (recall) a setting value of the various parameters. It is to be noted that these buttons are also able to be configured with a GUI by use of a touch panel stacked on the display 11.

Figure 6:
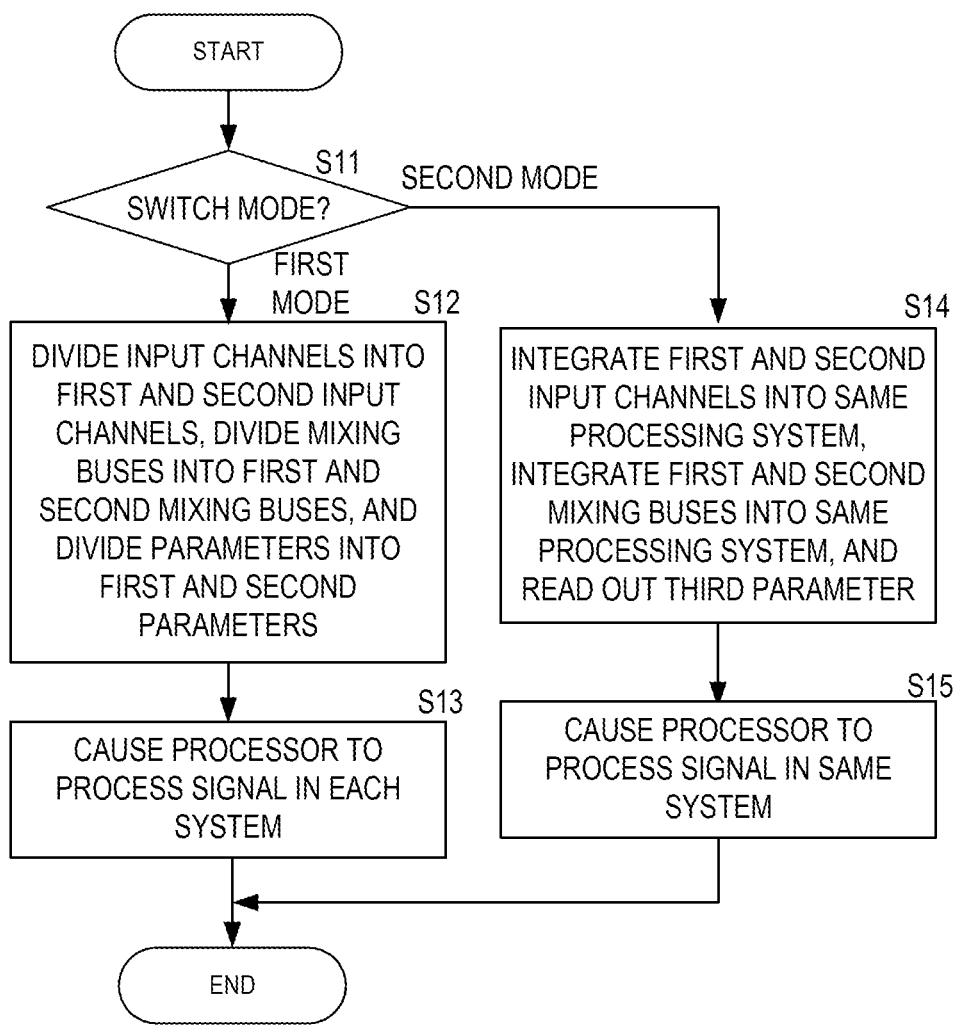
FIG. 6 is a flow chart showing an operation to switch between a split mode (a first mode) and a normal mode (a second mode) in a CPU 16.

Next, FIG. 6 is a flow chart showing an operation to switch between a split mode (a first mode) and a normal mode (a second mode) in a CPU 16.

The CPU 16 determines whether the current mode is the first mode or the second mode (S11). A change in the first mode and the second mode is received, for example, through a physical controller exclusive for the operator 12. The CPU 16, in a case of determining the first mode (S11: the first mode), divides the input channels into a first input channel being a first signal processing system and a second input channel being a second signal processing system, and divides the mixing buses into a first mixing bus being the first signal processing system and a second mixing bus being the second signal processing system (S12). In addition, the CPU 16 divides the parameters into a first parameter being the first signal processing system and a second parameter being the second signal processing system (S12). Then, the CPU 16 causes the signal processor 14 to perform signal processing in each system (S13). Specifically, the CPU 16 controls the signal processor 14 to perform an operation to process an audio signal to be outputted from the first input channel to the first mixing bus according to the first parameter in the first signal processing system, and controls the signal processor 14 to perform an operation to process an audio signal to be outputted from the second input channel to the second mixing bus according to the second parameter in the second signal processing system.

Figure 7:
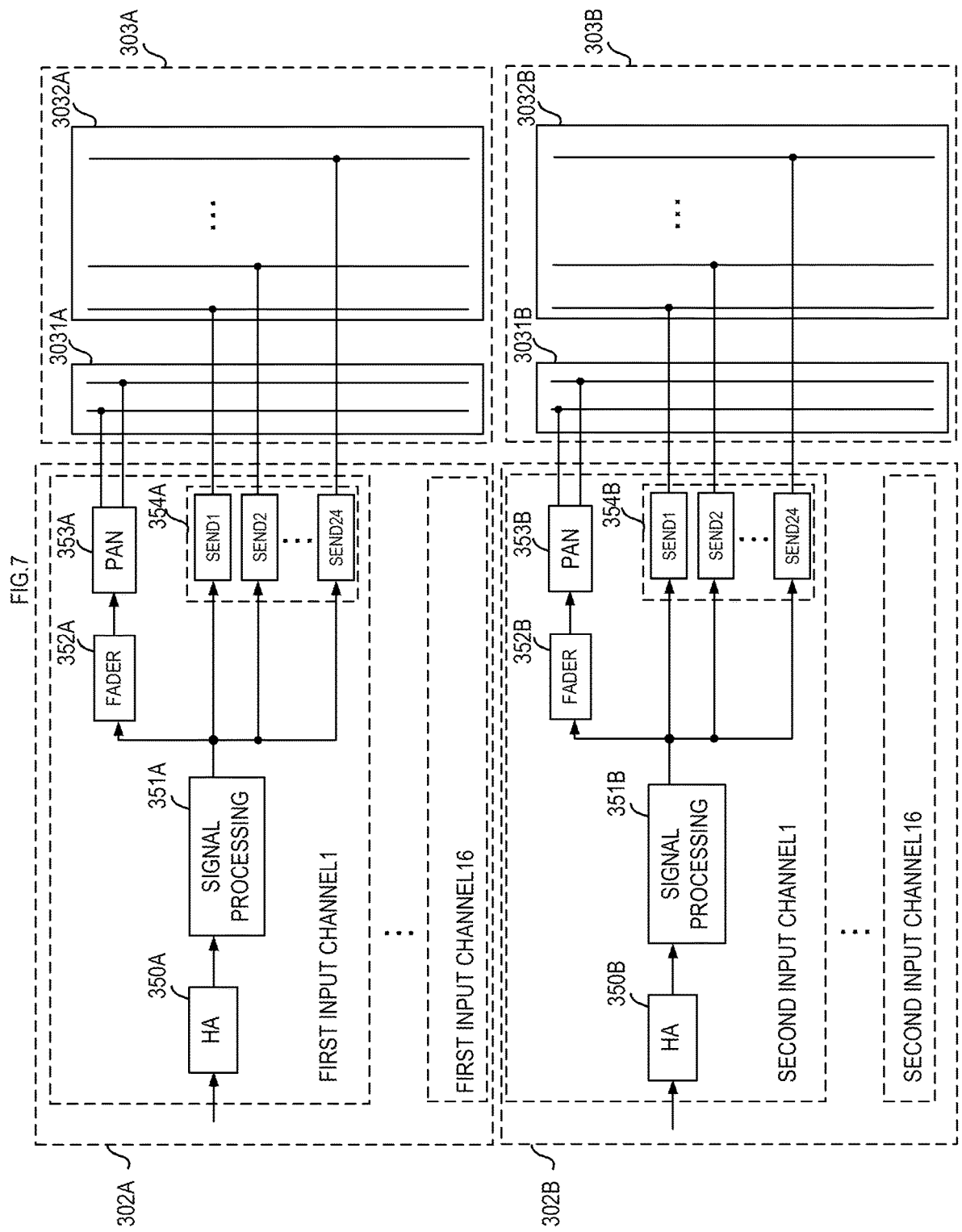
FIG. 7 is a block diagram functionally showing a configuration of signal processing of the input channel 302 and the mixing bus 303 in the first mode.

FIG. 7 is a block diagram functionally showing a configuration of signal processing of the input channel 302 and the mixing bus 303 in the first mode. In the first mode, the CPU 16 divides the input channel 302 into a first input channel 302A and a second input channel 302B. In addition, the CPU 16 divides the mixing bus 303 into a first mixing bus 303A and a second mixing bus 303B.

In the present embodiment, the number of input channels is 32, as an example. Therefore, the CPU 16 divides 32 input channels into 16 first input channels and 16 second input channels. In addition, in the present embodiment, the number of MIX buses in the mixing bus is 48, as an example. Therefore, the CPU 16 divides 48 MIX buses 3032 into 24 first MIX buses 3032A and 24 second MIX buses 3032B. Moreover, in this example, the CPU 16 divides other buses, for example, the stereo bus 3031 into a first stereo bus 3031A and a second stereo bus 3031B. However, the number of first and second input channels may be different. The number of first mix buses and the number of second mix buses may be different.

As shown in FIG. 7, each channel of the first input channel 302A performs gain adjustment of an audio signal, in an HA 350A. In addition, each channel of the input channel 302A performs signal processing such as an equalizer and a compressor, in a signal processing block 351A, on the audio signal on which the gain adjustment has been performed in the HA 350A. The audio signal on which the signal processing has been performed is level-adjusted in a fader (FADER) 352A, and then sent out to the mixing bus 303A in a subsequent stage, through a pan (PAN) 353A. The pan 353A adjusts a balance of a signal to be supplied to a stereo bus (a two-channel bus being as a master output) 3031A of the mixing bus 303A. In addition, the audio signal on which the signal processing has been performed is level-adjusted in a sender (SEND1 to SEND24) 354A, and then sent out to the mixing bus 303A in the subsequent stage.

Similarly, each channel of the second input channel 302B performs gain adjustment of an audio signal, in an HA 350B. In addition, each channel of the input channel 302B performs signal processing such as an equalizer and a compressor, in a signal processing block 351B, on the audio signal on which the gain adjustment has been performed in the HA 350B. The audio signal on which the signal processing has been performed is level-adjusted in a fader (FADER) 352B, and then sent out to the mixing bus 303B in a subsequent stage, through a pan (PAN) 353B. The pan 353B adjusts a balance of a signal to be supplied to a stereo bus (a two-channel bus being as a master output) 3031B of the mixing bus 303B. In addition, the audio signal on which the signal processing has been performed is level-adjusted in a sender (SEND1 to SEND24) 354B, and then sent out to the mixing bus 303B in the subsequent stage.

The signal processing of the first input channel 302A is controlled based on a value of the first parameter. The signal processing of the second input channel 302B is controlled based on a value of the second parameter. The CPU 16 stores current data of the first parameter and current data of the second parameter as separately different current data, in the RAM 18.

The first parameter corresponds to the first physical controller (the channel strip 63A, for example) of the operator 12, in the first section 100A. The second parameter corresponds to the second physical controller (the channel strip 63B, for example) of the operator 12, in the second section 100B.

The user, by operating the first physical controller (the channel strip 63A, for example) in the first section 100A, can adjust the value of the first parameter. The user, by operating the second physical controller (the channel strip 63B, for example) in the second section 100B, can adjust the value of the second parameter. The CPU 16 updates the current data of the first parameter when the user operates the first physical controller. The CPU 16 updates the current data of the second parameter when the user operates the second physical controller.

In addition, the user, by a first store operation to operate the STORE button 72A, can also cause the flash memory 17 to store the current data of the first parameter as a first scene memory, and, by a second store operation to operate the STORE button 72B, can also cause the flash memory 17 to store the current data of the second parameter as a second scene memory, The CPU 16 stores the data of the first scene memory and the data of the second scene memory as separately different data, in the flash memory 17.

Moreover, the user, by a first recall operation to operate the RECALL button 73A, can also read out the first scene memory from the flash memory 17, and, by a second recall operation to operate the RECALL button 73B, can also read out the second scene memory from the flash memory 17.

As a result, the user can operate one audio mixer 1 as two audio mixers of the first section 100A and the second section 100B. For example, a first user can operate the first physical controller in the first section 100A, and can operate the audio mixer 1 as a first mixer. On the other hand, a second user can operate the second physical controller in the second section 100B, and can operate the audio mixer 1 as a second mixer. The first parameter of the first input channel reflects the operation of the first physical controller and does not reflect the operation of the second physical controller. The second parameter of the second input channel reflects the operation of the second physical controller and does not reflect the operation of the first physical controller. Accordingly, the first user and the second user do not accidentally change the parameter being operated by the separately different user. Therefore, the audio mixer 1 is easy to use when a plurality of persons use one mixer.

Figure 8:
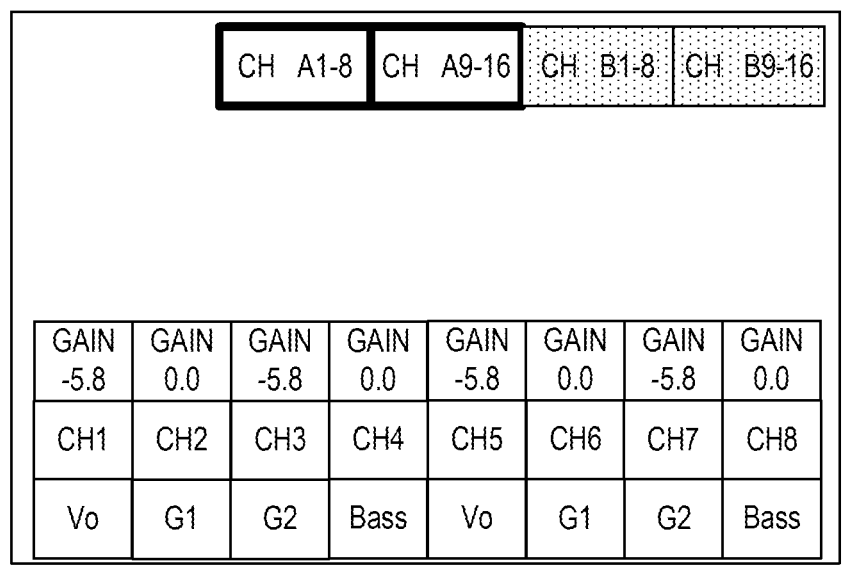
FIG. 8 is a view showing an example of a screen displayed on a display 11A in a case of receiving an operation to a first signal processing system.

In addition, the CPU 16 preferably changes a display on the display 11A and the display 11B, in a case of receiving an operation to the first signal processing system and in a case of receiving an operation to the second signal processing system. FIG. 8 is a view showing an example of a screen displayed on the display 11A in a case of receiving an operation to the first signal processing system, and FIG. 9 is a view showing an example of a screen displayed on the display 11B in a case of receiving an operation to the second signal processing system.

The CPU 16, in a case of receiving an operation to the first parameter by the first physical controller in the first section 100A, displays the display 11A in a first display mode shown in FIG. 8. In addition, the CPU 16, in a case of receiving an operation to the second parameter by the first physical controller in the second section 100B, displays the display 11B in a second display mode shown in FIG. 9.

Figure 9:
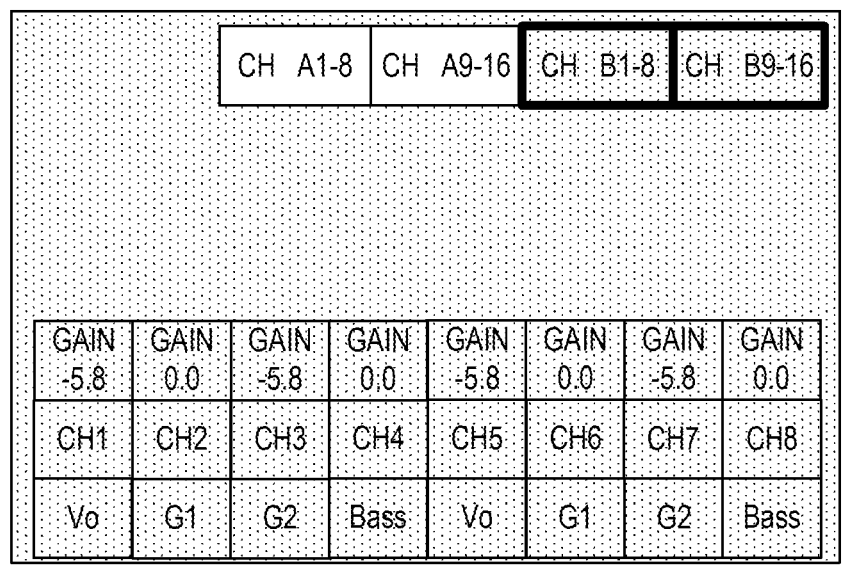
FIG. 9 is a view showing an example of a screen displayed on a display 11B in a case of receiving an operation to a second signal processing system.

In the example of FIG. 8 and FIG. 9, the CPU 16 changes a background color in the first display mode and the second display mode. It is to be noted that the first display mode and the second display mode are not limited to the example of different background colors and may be a mode in which brightness is different, for example. As a result, the user can easily determine whether to perform an operation to the first signal processing system or to perform an operation to the second signal processing system.

It is to be noted that, although the display 11 of the audio mixer 1 according to the present embodiment has the two displays of the display 11A in the first section and the display 11B in the second section, in a hypothetical case of only one display, the CPU 16 may switch and display the first display mode of FIG. 8, and the second display mode of FIG. 9. In such a case, the audio mixer 1 includes a physical controller for receiving an operation to switch between the first signal processing system and the second signal processing system. The CPU 16, in a case of receiving the operation to switch between the first signal processing system and the second signal processing system through the physical controller, switches the display to either the first display mode or the second display mode.

It is to be noted that, in the first mode, the same one input port is able to be assigned to both the first input channel and the second input channel. In such a case, a first parameter of the HA 350A and a second parameter of the HA 350B have the same value. In other words, the first signal processing system and the second signal processing system include performing sound processing according to a common signal processing parameter common to each other.

In such a case, the CPU 16 stores the common signal processing parameter in the flash memory 17 in both the first store operation and the second store operation. In addition, the CPU 16 reads out the common signal processing parameter from the flash memory 17 in both the first recall operation and the second recall operation.

It is to be noted that, in a case in which a gain of the HA 350A and a gain of the HA 350B are common signal processing parameters and a user changes the gain of the HA 350A, the gain of the HA 350B is also changed. For example, in a case in which the gain of the HA 350A is changed into −3 dB, the gain of the HA 350B is also changed into −3 dB.

In contrast, the audio mixer 1, even when the user changes the gain of the HA 350A of the first input channel, may receive a setting of gain compensation that maintains a gain setting of the second input channel. More specifically, the signal processing block 351B has a gain adjuster for compensating the gain changed in the HA 350B. In a case in which the setting of gain compensation is received and the gain of the HA 350A is changed into −3 dB, for example, the gain adjuster of the signal processing block 351B performs gain adjustment of +3 dB. Accordingly, the gain setting of the second input channel is maintained. The gain compensation may be received in each of the first input channel and the second input channel. In short, the setting of gain compensation that maintains the gain setting of the first input channel may be received. In such a case, the signal processing block 351A has a gain adjuster for compensating the gain changed by the HA 350A.

The gain compensation may be automatically set when a channel copy operation is received. FIG. 10 is a view showing an example of a channel copy receiving screen displayed on the display 11. The user, on the channel copy receiving screen, can select whether to copy the first input channel (Ch A) to the second input channel (Ch B) or to copy the second input channel (Ch B) to the first input channel (Ch A). In other words, the user can copy first signal processing setting with respect to the plurality of first input channels among the first parameters to second signal processing setting of the plurality of second input channels among second parameters or can copy second signal processing setting with respect to the plurality of second input channels among the second parameters to first signal processing setting of the plurality of first input channels among the first parameter. In the example of FIG. 8, the user performs a selection to copy the first input channels 1 to 16 (Ch A1-16) to the second input channels 1 to 16 (Ch B1-16).

In addition, the user can select a parameter to be copied, on the channel copy receiving screen.

Moreover, the user can select whether to set gain compensation, on the channel copy receiving screen. When the user sets the gain compensation (selects Set GC for copied HA) and performs a copy operation on the channel copy receiving screen, the CPU 16 sets the gain compensation to the input channel to have been copied. In the example of FIG. 10, since the user performs the selection to copy the first input channels 1 to 16 (Ch A1-16) to the second input channels 1 to 16 (Ch B1-16), the gain compensation is set to the second input channels 1 to 16 (Ch B1-16).

On the other hand, in the flow chart of FIG. 6, the CPU 16, in a case of determining the second mode (S11: the second mode), sets all the input channel 302 and the mixing bus 303 to the same signal processing system (S14). Specifically, the first input channel being the first signal processing system and the second input channel being the second signal processing system are integrated to the same signal processing system, and the first mixing bus being the first signal processing system and the second mixing bus being the second signal processing system are integrated to the same signal processing system (S14). In addition, the CPU 16 reads out a parameter to use in the second mode to the RAM 18, as a parameter (a third parameter) other than the first parameter and the second parameter (S14). The third parameter is a parameter obtained by storing the current data that is last read out to the RAM 18 when the second mode is shifted to the first mode, as a third parameter, in the flash memory 17. Alternatively, the CPU 16, when changing the first mode to the second mode, may read out either the first parameter or the second parameter to the RAM 18, as a parameter to use in the second mode.

Then, the CPU 16 causes the signal processor 14 to perform signal processing in the same signal processing system (S15). Specifically, the CPU 16 controls the signal processor 14 to perform an operation to process an audio signal to be outputted from the input channel 302 to the mixing bus 303 according to the third parameter read out to the RAM 18.

As described above, for example, the channel strip 63A is able to assign the input channels 1 to 16, and the channel strip 63B is able to assign the input channels 17 to 32. In such a case, the user can operate 32 input channels of the same signal processing system by using both the physical controllers of the first physical controller in the first section 100A and the second physical controller in the second section 100B.

In this manner, the audio mixer 1 is able to operate in the second mode as an audio mixer having a larger number of input channels and mixing buses.

Figure 11:
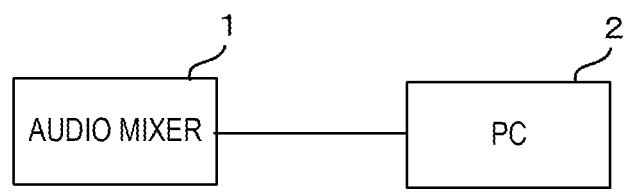
FIG. 11 is a block diagram showing an audio mixer 1 according to a first modification, and a PC 2 to be connected to the audio mixer 1.

It is to be noted that, in the first mode, the send level of an audio signal to be supplied from each input channel of the first signal processing system among the first parameters to each MIX bus, and the send level of an audio signal to be supplied from each input channel of the second signal processing system among the second parameters to each MIX bus are independent from each other. On the other hand, the third parameter in the second mode may include the send level of the audio signal to be supplied, for example, from the input channel having been the first signal processing system in the first mode to the MIX bus having been the second signal processing system, and may include the send level of the audio signal to be supplied from the input channel having been to the second signal processing system in the first mode to the MIX bus having been the first signal processing system. In addition, as described above, the CPU 16, when changing the first mode to the second mode, may read out either the first parameter or the second parameter to the RAM 18, as a parameter to use in the second mode. However, the CPU 16, in a case of reading out the first parameter to the RAM 18 as a parameter to use in the second mode, for example, may cause an audio signal not to be outputted to the MIX bus having been the second signal processing system mainly by setting the send level of the audio signal to be supplied to the MIX bus having been the second signal processing system to −∞ dB. Similarly, the CPU 16, in a case of reading out the second parameter to the RAM 18 as a parameter to use in the second mode, for example, may cause an audio signal not to be outputted to the MIX bus having been the first signal processing system mainly by setting the send level of the audio signal to be supplied to the MIX bus having been the first signal processing system to −∞ dB. Subsequently, FIG. 11 is a block diagram showing an audio mixer 1 according to a first modification, and a PC 2 to be connected to the audio mixer 1. The audio mixer 1 and the PC 2 are connected, for example, by a USB (Universal Serial Bus) cable. Alternatively, the audio mixer 1 and the PC 2 may be connected, for example, by a network cable or a wireless LAN or may be connected through Internet connection.

The PC 2 is an example of an external apparatus of the present disclosure. The PC 2 is connected to the audio mixer 1, for example, through a web application program (a GUI program), and receives an operation to the audio mixer 1, from a user of the PC 2. As a result, the user of the PC 2 can operate the audio mixer 1 at a location away from the audio mixer 1.

However, the CPU 16 of the audio mixer 1 receives only an operation to the first signal processing system from the PC 2, and receives an operation to the second signal processing system only from the second physical controller in the second section 100B. In other words, the CPU 16 sets up to receive an operation to the first parameter from an external apparatus or the first physical controller, and to receive an operation to the second parameter only from the second physical controller.

For example, a first user operates the first parameter through the PC 2. On the other hand, a second user operates the second physical controller in the second section 100B to operate the second parameter. The first parameter of the first input channel reflects the operation from the PC 2 or the operation of the first physical controller and does not reflect the operation of the second physical controller. The second parameter of the second input channel reflects only the operation of the second physical controller and does not reflect the operation from the PC 2 or the operation of the first physical controller. Therefore, the second user is not affected by a wrong operation by other users at a remote place.

The audio mixer 1 preferably includes a backup memory that temporarily stores setting information of the audio mixer 1 including the first parameter and the second parameter. The backup memory, although being an external storage to be connected to the audio mixer 1, is preferably accommodated in the flash memory 17.

The setting information of the audio mixer 1 includes not only the first parameter and the second parameter but also the data of the first scene memory, the data of the second scene memory, the common signal processing parameter, and preference setting such as brightness of the display or a language to display.

The CPU 16 temporarily stores the setting information of the audio mixer 1 in the backup memory, whenever a predetermined time (1 minute, for example) elapses, when the first mode and the second mode are switched, or when the operation to switch between the first signal processing system and the second signal processing system is received. A user recalls the setting information stored in the backup memory at any timing, and can reset the setting information to the audio mixer 1.

As a result, the user can freely return a state of the audio mixer 1 to the state at a certain point of time, in a case of accidentally changing a parameter, in a case of having adjusted a parameter, in a case of desiring to compare a sound difference with a parameter before adjustment, or the like.

The description of the foregoing embodiments is illustrative in all points and should not be construed to limit the present disclosure. The scope of the present disclosure is defined not by the foregoing embodiments but by the following claims. Further, the scope of the present disclosure is intended to include all modifications within the scopes of the claims and within the meanings and scopes of equivalents.

What is claimed is:

1. An audio mixer comprising:
an operation panel that includes a plurality of physical controllers that control a value of a parameter;
a signal processor that processes an audio signal to be outputted from a plurality of input channels to a plurality of mixing buses according to the value of the parameter; and
a processor that controls an operation of the signal processor, wherein:
the plurality of physical controllers include a first physical controller that controls a value of a first parameter and a second physical controller that controls a value of a second parameter; and
the processor, in a first mode,
divides the plurality of input channels into a first input channel of a first signal processing system and a second input channel of a second signal processing system different from the first signal processing system,
divides the plurality of mixing buses into a first mixing bus of the first signal processing system and a second mixing bus of the second signal processing system,
controls the signal processor to perform a first operation to process an audio signal to be outputted from the first input channel to the first mixing bus according to the value of the first parameter in the first signal processing system, and
controls the signal processor to perform a second operation to process an audio signal to be outputted from the second input channel to the second mixing bus according to the value of the second parameter in the second signal processing system, and
the processor, in a second mode different from the first mode,
controls, by using the plurality of input channels and the plurality of mixing buses as part of the same signal processing system, the signal processor to perform a third operation to process an audio signal to be outputted from the plurality of input channels to the plurality of mixing buses according to the value of the first parameter and the value of the second parameter in the same signal processing system.

2. The audio mixer according to claim 1, wherein the processor is configured to receive the value of the first parameter from an external apparatus and to receive the value of the second parameter only from the second physical controller.

3. The audio mixer according to claim 1, further comprising a display,
wherein the processor, in a case of receiving the value of the first parameter by the first physical controller, causes the display to display a first screen in a first display mode, and, in a case of receiving the value of the second parameter by the second physical controller, causes the display to display a second screen in a second display mode different from the first display mode.

4. The audio mixer according to claim 1, further comprising a storage, wherein the processor
receives a first store operation to store the value of the first parameter in the storage as a first scene memory, and a first recall operation to read out the value of the first parameter stored as the first scene memory from the storage, and
receives a second store operation to store the value of the second parameter in the storage as a second scene memory, and a second recall operation to read out the value of the second parameter stored as the second scene memory from the storage.

5. The audio mixer according to claim 4, wherein in the first mode:
the processor further controls the first signal processing system and the second signal processing system to perform sound processing according to a common signal processing parameter common to the first signal processing system and the second signal processing system; and
the processor stores the common signal processing parameter in both the first store operation and the second store operation, in the storage, and reads out the common signal processing parameter in both the first recall operation and the second recall operation, from the storage.

6. The audio mixer according to claim 1, further comprising a backup memory that temporarily stores setting information of the audio mixer, the setting information including the value of the first parameter and the value of the second parameter, wherein the processor
receives an operation to switch between the first signal processing system and the second signal processing system, and
stores the setting information in the backup memory, when receiving the operation to switch between the first signal processing system and the second signal processing system.

7. The audio mixer according to claim 1, wherein the processor receives a copy operation to copy a first signal processing setting of the first parameter with respect to the plurality of first input channels to a second signal processing setting of the second parameter of the plurality of second input channels, or to copy the second signal processing setting of the second parameter with respect to the plurality of second input channels to the first signal processing setting of the first parameter of the plurality of first input channels.

8. The audio mixer according to claim 7, wherein the processor, when receiving the copy operation, in a case of receiving an operation to change a gain in one of the first signal processing setting and the second signal processing setting, further receives a setting of gain compensation to maintain a gain setting in another signal processing setting.

9. The audio mixer according to claim 1, wherein:
a number of first input channels is different from a number of second input channels; and
a number of first mixing buses is different from a number of second mixing buses.

10. A method of controlling an audio mixer including a plurality of input channels, a plurality of mixing buses, and an operation panel that includes a plurality of physical controllers that control a value of a parameter, the plurality of physical controllers including a first physical controller and a second physical controller, the method comprising:
processing, by a signal processor, an audio signal to be outputted from the plurality of input channels to the plurality of mixing buses according to the value of the parameter; and
controlling, by a processor, an operation of the signal processor, wherein:
in a first mode, controlling by the processor includes:
dividing the plurality of input channels into a first input channel of a first signal processing system and a second input channel of a second signal processing system different from the first signal processing system, dividing the plurality of mixing buses into a first mixing bus of the first signal processing system and a second mixing bus of the second signal processing system, controlling the signal processor to perform a first operation to process an audio signal to be outputted from the first input channel to the first mixing bus according to a value of a first parameter, controlled by the first physical controller, in the first signal processing system, and controlling the signal processor to perform a second operation to process an audio signal to be outputted from the second input channel to the second mixing bus according to a value of a second parameter, controlled by the second physical controller, in the second signal processing system, and in a second mode different from the first mode, controlling by the processor includes:

controlling, by using the plurality of input channels and the plurality of mixing buses as part of the same signal processing system, the signal processor to perform a third operation to process an audio signal to be outputted from the plurality of input channels to the plurality of mixing buses according to the value of the first parameter and the value of the second parameter in the same signal processing system.

11. The method of controlling the audio mixer according to claim 10, further comprising receiving the value of the first parameter from an external apparatus, wherein the value of the second parameter is received only from the second physical controller.

12. The method of controlling the audio mixer according to claim 10, further comprising displaying a first screen, on a display and in a case where the value of the first parameter is received by the first physical controller, in a first display mode, and displaying a second screen, on the display and in a case where the value of the second parameter is received by the second physical controller, in a second display mode different from the first display mode.

13. The method of controlling the audio mixer according to claim 10, further comprising: receiving a first store operation to store the value of the first parameter in a storage of the audio mixer as a first scene memory, and a first recall operation to read out the value of the first parameter stored as the first scene memory from the storage, and receiving a second store operation to store the value of the second parameter in the storage as a second scene memory, and a second recall operation to read out the value of the second parameter stored as the second scene memory from the storage.

14. The method of controlling the audio mixer according to claim 13, wherein, in the first mode, controlling by the processor further comprises:

controlling the first signal processing system and the second signal processing system to perform sound processing according to a common signal processing parameter common to the first signal processing system and the second signal processing system;

storing, in the storage, the common signal processing parameter in both the first store operation and the second store operation, and reading out, from the storage, the common signal processing parameter in both the first recall operation and the second recall operation.

15. The method of controlling the audio mixer according to claim 10, wherein the audio mixer further includes a backup memory that temporarily stores setting information of the audio mixer, the setting information including the value of the first parameter and the value of the second parameter, the method further comprising:

receiving an operation to switch between the first signal processing system and the second signal processing system, and storing the setting information in the backup memory, when receiving the operation to switch between the first signal processing system and the second signal processing system.

16. The method of controlling the audio mixer according to claim 10, further comprising receiving a copy operation to copy a first signal processing setting of the first parameter with respect to the plurality of first input channels to a second signal processing setting of the second parameter of the plurality of second input channels, or to copy the second signal processing setting of the second parameter with respect to the plurality of second input channels to the first signal processing setting of the first parameter of the plurality of first input channels.

17. The method of controlling the audio mixer according to claim 16, further comprising receiving, when receiving the copy operation, in a case of receiving an operation to change a gain in one of the first signal processing setting and the second signal processing setting, a setting of gain compensation to maintain a gain setting in another signal processing setting.

18. The method of controlling the audio mixer according to claim 10, wherein in the audio mixer:

a number of first input channels is different from a number of second input channels; and a number of first mixing buses is different from a number of second mixing buses.

* * * * *